United States Patent [19]

Flanigen et al.

[11] 4,073,865
[45] Feb. 14, 1978

[54] SILICA POLYMORPH AND PROCESS FOR PREPARING SAME

[75] Inventors: Edith Marie Flanigen, White Plains; Robert Lyle Patton, Katonah, both of N.Y.

[73] Assignee: Union Carbide Corporation, New York, N.Y.

[21] Appl. No.: 726,744

[22] Filed: Sept. 27, 1976

[51] Int. Cl.$^2$ ............................................. C01B 33/12
[52] U.S. Cl. .................................. 423/339; 423/335; 252/449
[58] Field of Search .............. 423/325, 332, 333, 335, 423/339; 252/449, 454

[56] References Cited

U.S. PATENT DOCUMENTS 3,941,871  3/1976  Dwyer et al. .................... 252/454 X

FOREIGN PATENT DOCUMENTS 927,658  5/1963  United Kingdom ................. 423/339

*Primary Examiner*—Jack Cooper
*Attorney, Agent, or Firm*—Richard G. Miller

[57] ABSTRACT

Large crystals of a silica polymorph having a characteristic X-ray diffraction pattern, a specific gravity of 1.70 ± 0.05 g/cc. and a mean refractive index of 1.39 ± 0.01 after calcination in air at 600° C., are prepared by a hydrothermal process in which fluoride anions are included in the reaction mixture. The crystals, which can be as large as 200 microns, exhibit a substantial absence of infrared adsorption in the hydroxyl-stretching region and also exhibit an exceptional degree of hydrophobicity.

6 Claims, 1 Drawing Figure

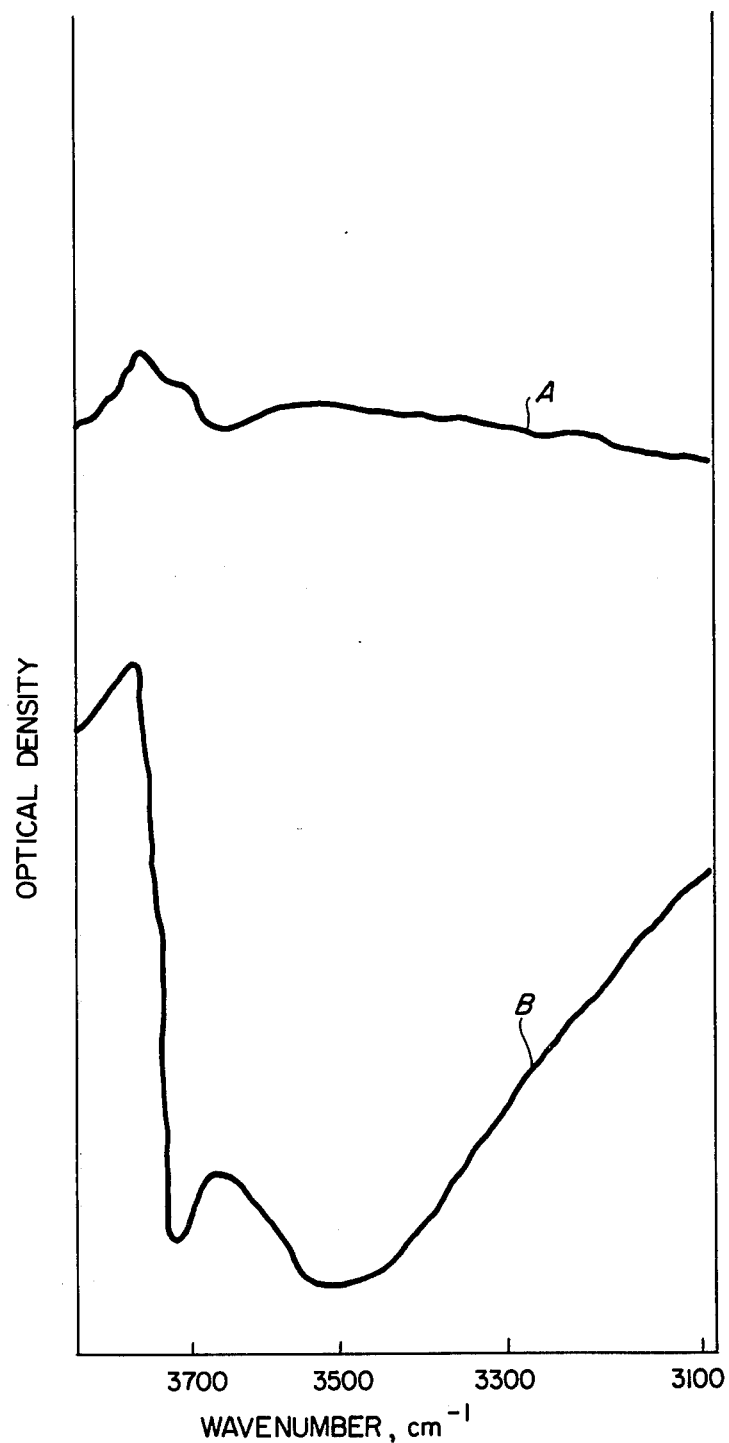

SILICA POLYMORPH AND PROCESS FOR PREPARING SAME

The present invention relates in general to a novel crystalline silica polymorph and to the method for its preparation.

Crystalline forms of silica are found in nature and also exists as synthetic forms which apparently have no natural counterpart. Among those found in nature are quartz, tridymite and cristobalite, each having polymorphic forms stable in different ranges of temperature. At ordinary temperatures the stable form is alpha-quartz which inverts at 573° C. to beta-quartz, which is stable up to 867° C. At this temperature level, tridymite becomes the stable phase and remains so up to 1470° C. At temperatures in excess of 1470° C. cristobalite is the stable phase and remains so up to about 1713° C.

Perhaps the first true silica polymorph to be synthesized is coesite silica. This crystalline composition is defined and its method of manufacture described in detail in U.S. Pat. No. 2,876,072 issued to L. Coes, Jr. on Mar. 3, 1959. A more recently discovered silica polymorph, called silicalite, is disclosed in copending application Ser. No. 615,557 filed Sept. 22, 1975 and entitled "Crystalline Silica." As set forth therein, silicalite is a crystalline form of silica which has a characteristic X-ray powder diffraction pattern, an orthorhombic morphology with unit cell parameters, $a = 20.05 \pm 0.1$ A, $b = 20.0 \pm 0.1$ A. $c = 13.4 \pm 0.1$ A pore diameters of about 6 Angstroms, a pore volume of 0.18 cc./gram as determined by adsorption, an absence of ion-exchange capacity and, after calcination in air for 1 hour at 600° C., a mean refractive index of $1.39 \pm 0.01$ and a specific gravity at 25° C. of $1.70 \pm 0.05$ g./cc.

There has now been discovered a new crystalline silica polymorph which has some properties quite similar to silicalite but which is readily distinguishable therefrom on the basis of X-ray diffraction patterns, degree of hydrophobicity and infra-red absorption characteristics, particularly in the hydroxyl-stretching frequency range of 3700 to 3100 cm$^{-1}$, among others.

In accordance with the present invention, the novel silica polymorph is prepared by the process which comprises providing a reaction mixture having a pH below 11, preferably within the range of 7 to 11, more preferably 7.4 to 10, which in terms of moles of oxides contains from 150 to 1500 moles H$_2$O, from 13 to 50 moles SiO$_2$, from 2 to 12 moles of fluoride ion and from 0 to 20 moles, preferably 0 to 6 moles, M$_2$O wherein M represents an alkali metal cation, each of the aforesaid reagents being present per mole of Q$_2$O wherein Q represents a quaternary cation having the formula (R$_4$X)+, in which each R represents hydrogen or an alkyl group containing from 2 to 6 carbon atoms, and X represents phosphorus or nitrogen, heating the reaction mixture thus provided at a temperature of from 100° to 250° C. until a crystalline hydrated precursor is formed, usually about 50 to 150 hours, isolating said crystalline precursor and calcining same at a temperature of from 400° C. to 1000° C.

The fluoride anion is suitably supplied to the reaction mixture by any fluorine-containing compound which ionizes sufficiently in the reaction mixture to provide the requisite 2 to 12 moles of fluoride ion per mole of Q$_2$O present. Ammonium fluoride and potassium fluoride, being extremely soluble in water at 20° C., are readily availabe and are especially suitable for use in the present process. Other suitable compounds include, but are not limited to, sodium fluoride, hydrofluoric acid, ammonium bifluoride and cryptohalite.

The alkylonium cation is suitably supplied to the reaction system by a compound preferably soluble in the reaction mixture and which contains a quaternary cation generally expressed by the formula

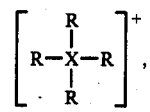

wherein R is an alkyl radical containing from 2 to 6 carbon atoms and X represents either phosphorus or nitrogen. Preferably R is ethyl, propyl or n-butyl, especially propyl, and X is nitrogen. Illustrative compounds include tetraethylammonium hydroxide, tetrapropylammonium hydroxide, tetrabutylammonium hydroxide, tetrabutylphosphonium hydroxide and the salts corresponding to the aforesaid hydroxides, particularly the chloride, iodide and bromide salts, for example, tetrapropylammonium bromide. The quaternary compounds can be supplied to the reaction mixture per se or can be generated in situ, such as by the reaction of tertiary amines with alkyl halides or alkyl sulfates.

When the quaternary cation and the fluoride source are provided in forms such that their interaction within the system results in a basicity equivalent to the pH of 7 to 11, e.g. as tetrapropylammonium bromide and ammonium fluoride, the reaction mixture need contain only water and a reactive form of silica as additional ingredients. In those cases in which an acidic source of fluoride ion has been used and it is desired to adjust the pH upwards into the preferred range of 7.4 to 10 to avoid unnecessary prolonging of reaction times, ammonium hydroxide, alkali metal hydroxide, or other basic reagents can be suitably employed for that purpose, particularly the hydroxides which do not unduly diminish the fluoride content of the reaction mixture by virtue of precipitating insoluble fluorine salts. The amounts required for such pH control can be readily determined by employing the well known chemical principles of neutralization.

Similarly, if the quaternary cation and/or the silica source are added to the system in such forms that the resultant pH is greater than 11, the necessary pH adjustment may be made conveniently with an acidic fluoride source or, alternatively, with mineral acid or other reagents which can neutralize or moderate the high basicity of the system.

It is observed that the temperature and pH, as well as the fluoride presence, have a pronounced effect upon the size and shape of the product crystals obtained. For example, when the reaction system is at a pH of approximately 12 or greater and the crystallization temperature is 100° C., tiny submicron size crystals are produced, but increasing the crystallization temperature of 150° –200° C results in the formation of crystals having sizes of from 2 to 15 microns. Crystals of similar size, i.e., 2 to 15 microns, are also produced at 100° C if the pH is decreased to about 11 or lower in the presence of fluoride ion. Accordingly, when crystals in the range of 2 to 15 microns are suitable for a chosen application, the process embodiment of the present invention is advantageously employed in which the reaction mixture contains, in addition to water and a silica source, 2 or more moles of fluoride anions per mole of $Q_2O$ and sufficient alkali metal oxide to provide a pH of about 11 or lower and the reaction temperature is about 100° C. The advantages of this embodiment include the economy of lower synthesis temperatures and consequently lower autogenous pressures, plus faster crystallization rates than in prior known processes run at comparable temperatures.

Suitable sources of silica for use in preparing the reaction system are in general those commonly employed in the preparation of crystalline zeolite aluminosilicates. Akali metal silicates can be used in whole or in part, as can the well known reactive forms of silica such as silca sols, silica gels and solid reactive amorphous silicas such as fume silica. Since the nature of the reaction system is favorable for the incorporation of alumina as an impurity into the crystalline silica product, care should be exercised in the selection of the silica source from the standpoint of its content of alumina as an impurity. Commercially available silica sols can typically contain from 500 to 700 ppm $Al_2O_3$, whereas fume silicas can contain from 80 to 2,000 ppm of $Al_2O_3$ impurity. Small quantities of $Al_2O_3$ present in the crystalline silica product of this invention in no way significantly alters its essential properties, and in no sense is the present silica polymorph which contains alumina or other oxide impurities properly considered to be a metallosilicate.

The X-ray powder diffraction pattern of the silica composition of this invention determined using a sample which has been calcined in air for at least one hour at 600° C., has at least the interplanar spacings d (A) set forth in Table A below, wherein the relative intensities of the X-ray reflections observed at these spacings are noted as "very strong", "strong", or "weak".

TABLE A

| d - (A) | Relative Intensity |
| --- | --- |
| 11.1 ± 0.2 | very strong |
| 10.0 ± 0.2 | very strong |
| 9.75 ± 0.1 | strong |
| 3.85 ± 0.04 | very strong |
| 3.82 ± 0.04 | strong |
| 3.71 ± 0.02 | strong |
| 3.62 ± 0.02 | weak | and is further characterized by the absence of a reflection intermediate the reflections which correspond to d-spacings of 3.82 ± 0.04 A and 3.71 ± 0.02 A.

The data representing the x-ray powder diffraction pattern of a typical sample [Example 1 (b) hereinbelow] of the present silica composition after being calcined in air for 2 hours at 600° C is set forth in Table B below, wherein $\theta$ is the Bragg angle.

TABLE B

| 2θ (degrees) | d(A) | Relative Intensity | 2θ degrees | d(A) | Relative Intensity |
| --- | --- | --- | --- | --- | --- |
| 7.94 | 11.14 | 91 | 28.15 | 3.17 | 0.5 |
| 8.83 | 10.01 | 100 | 28.4 | 3.14 | 0.6 |
| 9.07 | 9.75 | 17 | 29.21 | 3.06 | 2 |
| 9.84 | 8.99 | 1 | 29.40 | 3.04 | 2 |
| 11.00 | 8.04 | 0.5 | 29.91 | 2.99 | 7 |
| 11.90 | 7.44 | 0.5 | 30.23 | 2.96 | 3 |
| 12.50 | 7.08 | 0.2 | 30.56 | 2.93 | 0.6 |
| 13.23 | 6.69 | 4 | 30.66 | 2.92 | 0.5 |
| 13.92 | 6.36 | 6 | 31.23 | 2.86 | 1 |
| 14.78 | 5.99 | 10 | 32.10 | 2.79 | 0.5 |
| 15.52 | 5.71 | 5 | 32.74 | 2.74 | 1.5 |
| 15.90 | 5.57 | 5 | 33.41 | 2.68 | 0.5 |
| 16.51 | 5.37 | 1 | 33.77 | 2.65 | 0.5 |
| 16.64 | 5.33 | 1 | 34.32 | 2.61 | 1 |
| 17.01 | 5.21 | 0.3 | 34.59 | 2.59 | 1 |
| 17.31 | 5.12 | 1.5 | 35.08 | 2.56 | 1 |
| 17.66 | 5.02 | 5 | 35.64 | 2.52 | 1.5 |
| 17.85 | 4.97 | 6 | 36.12 | 2.49 | 2 |
| 18.20 | 4.92 | 0.6 | 36.22 | 2.48 | 1.5 |
| 18.80 | 4.72 | 0.5 | 36.33 | 2.47 | 1 |
| 19.22 | 4.62 | 2 | 37.19 | 2.42 | 1 |
| 19.88 | 4.47 | 0.6 | 37.47 | 2.400 | 1.5 |
| 20.39 | 4.36 | 3 | 37.59 | 2.393 | 1.5 |
| 20.88 | 4.25 | 4 | 38.70 | 2.327 | 0.3 |
| 21.49 | 4.13 | 0.5 | 41.10 | 2.196 | 0.8 |
| 21.80 | 4.08 | 1.5 | 41.50 | 2.176 | 0.6 |
| 22.20 | 4.00 | 3 | 42.60 | 2.122 | 0.3 |
| 23.09 | 3.85 | 44 | 43.20 | 2.094 | 0.3 |
| 23.30 | 3.82 | 25 | 43.60 | 2.076 | 0.6 |
| 23.97 | 3.71 | 21 | 45.03 | 2.013 | 5 |
| 24.37 | 3.65 | 5 | 45.57 | 1.991 | 5 |
| 24.58 | 3.62 | 5 | 46.52 | 1.952 | 1 |
| 24.80 | 3.59 | 1 | 47.73 | 1.905 | 1 |
| 25.57 | 3.48 | 1.5 | 48.51 | 1.877 | 0.8 |
| 25.82 | 3.45 | 3 | 48.89 | 1.863 | 0.6 |
| 25.92 | 3.44 | 3 | 49.91 | 1.827 | 0.5 |
| 26.58 | 3.35 | 3 | 51.78 | 1.766 | 0.8 |
| 26.91 | 3.31 | 5 | 53.20 | 1.749 | 0.6 |
| 27.42 | 3.25 | 1.5 | 55.01 | 1.669 | 1.5 |
| 27.61 | 3.23 | 0.8 | 55.70 | 1.650 | 0.6 |
| 27.70 | 3.22 | 0.5 | | | |

The various process embodiments of the present invention and the unique properties of the crystalline silica polymorph produced thereby are illustrated and exemplified in the following examples, some of which are further illustrated by means of the drawings.

The FIGURE is a graphic presentation of the infrared absorption spectra identified as "A" and "B", respectively, in the region of hydroxyl-stretching frequencies 3700 to 3100 $cm^{-1}$, for compositions prepared by the methods of the present invention and by the methods of the aforesaid Ser. No. 615,557.

EXAMPLE 1

(a) A reaction mixture was prepared as follows:
6.2 grams of ammonium fluoride was dissolved in 20 g. of water. The solution thus formed was added to 158.4 g. of an aqueous colloidal silica gel containing 30% by weight $SiO_2$ diluted with 36 g. water. To this was added a solution of 5 g. of sodium hydroxide in 10 g. of water, followed by the addition of 10.6 g. of tetrapropylammonium (TPA) bromide dissolved in 20 g. of water. The overall reaction mixture thus contains 0.791 moles of $SiO_2$, 11.2 moles water, 0.02 moles of $(TPA)_2O$, 0.063 moles of $Na_2O$ and 0.166 moles of $NH_4F$. The pH of the reaction mixture was 9.75. This synthesis mix was placed in a pressure reactor lined with polytetrafluoroethylene, sealed and heated at 200° C for 92 hours. The solid reaction product was recovered by filtration, washed with water and dried at 100° C. in air. The X-ray powder diffraction pattern of a sample of the crystalline product was that of the silica polymorph of the present invention in accordance with Table A, and showed no presence of quartz impurity. Chemical analysis of the product (wt. basis) showed: 87.9 wt.% $SiO_2$, 0.02 wt.% $Na_2O$, 11.5 wt.% $(TPA)_2O$ (based on carbon analysis) and about 185 parts per million (wt. basis) of $Al_2O_3$. Fluoride content, expressed as wt.% F, was 0.95. Electron microscope examination of a sample showed that the crystals has a dipyramidal rod shape measuring 150 × 20 × 20 microns. Adsorption properties for the product after calcination in air at 600° C. for 2 hours are set forth in Table C, infra.

(b) A portion of the solid crystalline precursor obtained in part (a) above was ground to a particle size of less than one micron and calcined in air at about 600° C. for 2 hours. After cooling to room temperature in the ambient atmosphere, the adsorption properties of the resulting silica polymorph were determined using a McBainBakr gravimetric adsorption system. In the system the sample was activated by heating to 350° C. under vacuum for 16 hours. The fluoride content of the calcined sample was found to be 0.07 wt.%. Adsorption measurements were subsequently made using a variety of adsorbates at various temperatures and pressures. The results are shown in Table C, infra. The X-ray powder diffraction pattern of this product is set forth in Table B, hereinabove. The infrared spectrum exhibited by this product in the region of 3700 to 3100 cm$^{-1}$ is shown in the drawing and is identified therein as "A". The infrared spectrum in the same region for the silicalite composition described in copending Ser. No. 615,557 is shown in the drawing and identified as "B". The comparison silicate sample was prepared by adding 9.0 g of $(C_3H_7)_4N$ Br, dissolved in 30 g of $H_2O$, to 132 g of "Ludox LS" silica sol (30% $SiO_2$) with manual stirring. To this mixture was added a solution of 4.2 g of NaOH dissolved in 45 g of water, again with hand stirring. The overall reaction mixture thus had a molar oxide composition of 2.0 $(TPA)_2O$. 6.5 $Na_2O$ . 80 $SiO_2$. 1105 $H_2O$, where "TPA" is tetrapropylammonium. This mixture was placed in a polytetrafluoroethylene-lined pressure vessel and heated at 200° C for 72 hours. The crystalline product was thereafter recovered by filtration, washing and drying at 100° C. Portions of the solid product were submitted for X-ray and chemical analysis; by the results thereof the product was identified as silicalite. A sample of this product was calcined in air at 600° C for 1 hour, and then treated with 10% HCL solution (aqueous) at 80° C for 1 hour to remove residual alkali metal. The treated sample was recovered by filtration and washing, and then dried at 110° C.

Both the "A" and "B" spectra were obtained on samples that had been pressed into 20 mg. self-supported wafer and evacuated for one hour at room temperature using a Perkin-Elmer Model 112 single-beam instrument. The absence of infrared absorption in this region as shown in spectrum "A" is typical of the composition of the present invention as prepared from a reaction mixture containing fluoride ions.

EXAMPLE 2

Using essentially the same procedure as in Example 1, 10.6 g. of tetrapropylammonium bromide, 88.0 g. water, 158.4 g. of an aqueous colloidal silica sol (30 wt.% $SiO_2$), 3.2 g. of sodium hydroxide and 3.3 g. of $NH_4F$ were admixed to form a reaction mixture having a molar oxide composition ratio of: 2.0 $Na_2O$ : 4.5 $NH_4F$ : 39.6 $SiO_2$: 560 $H_2O$: 1.0 $(TPA)_2O$. The reaction mixture pH was 9.85. A reaction temperature of 200° C. was maintained for 92 hours. The crystalline product was thereafter recovered by filtration, washing and drying at 100° C. Portions of the product were submitted for X-ray and chemical analysis. The X-ray powder diffraction pattern was that of the silica polymorph of the present invention, in accordance with Table "A", and showed that the product was free of quartz impurity. Chemical composition was as follows: 88.3 wt.% $SiO_2$, 0.03 wt.% $Na_2O$, 11.4 wt.% $(TPA)_2O$ and 0.92 wt.% F. Crystal size and shape were similar to that of the product of Example 1. After calcination at 600° C the fluoride content was found to be 0.15 wt.%.

EXAMPLE 3

Using essentially the same procedure as in Example 2, a reaction mixture of the same composition with respect to silica, water and $(TPA)_2O$ was prepared; however, no alkali metal was used and the amount of $NH_4F$ reactant was increased to 10 moles per mole of $(TPA)_2O$. Reaction mixture pH was 7.40. Reaction temperature of 200° C was maintained for 172 hours. The X-ray pattern of the crystalline product of the reaction had at least the interplanar spacings of Table A, and also showed a trace of cristobalite. Crystal morphology was similar to that of the above-described products; size was 30 × 60 microns. Chemical composition was as follows: 88.55 wt% $SiO_2$, 0.01 wt.% $Na_2O$, 10.6 wt.% $(TPA)_2O$ and 0.83 wt.% F. The alumina content was 40 ppm. After calcination the fluoride content was found to be 0.45 wt.%.

EXAMPLE 4

(a) Using procedures, reagents and apparatus as described in Example 1 a reaction mixture was prepared which contained 0.02 moles $(TPA)_2O$, 0.791 moles $SiO_2$, 0.2 moles ammonium fluoride and 11.2 moles water. After heating the reaction mixture at 100° C. for 648 hours, the crystalline precursor product had the chemical composition before calcination, of 88.2 wt.% $SiO_2$, 10.9 wt.% $(TPA)_2O$ and 0.89 wt.% F. The precursor crystal product contained no quartz impurity and consisted of large rod-shaped crystals measuring 91 × 34 microns. Adsorption properties of the calcined product treated and tested in accordance with the adsorption procedure of Example 1 (b) are set forth in Table C, infra.

(b) The synthesis of part (a) of this Example 4 was repeated except that the reaction mixture was heated at 200° C. for 48 hours. The crystalline silica product consisted of rod-shaped crystals 162 × 49 microns. No quartz impurity was evident. The adsorption properties of the calcined product are set forth in Table C, infra. The x-ray powder diffraction patterns of calcined samples of both products 4(a) and 4(b) were in accordance with Table A.

EXAMPLE 5

Using procedures, reagents and apparatus as described in Example 1, a reaction mixture was prepared which contained 0.02 moles $(TPA)_2O$, 0.791 moles $SiO_2$, 0.2 moles KF and 11.2 moles water. After heating the reaction mixture, which has an initial pH of 8.2, for 71 hours at 200° C., the crystalline precursor product had the chemical composition, before calcination, of 88.2 wt.% $SiO_2$, 10.9 wt.% $(TPA)_2O$, 0.10 wt.% $K_2O$ and 0.79 wt.% F. The precursor crystal product contained no quartz impurity and consisted of large rod-shaped crystals measuring 213 × 30 microns. The X-ray powder diffraction pattern of a calcinated sample of the product was in accordance with Table A. Adsorption properties of the calcinated product treated and tested, in accordance with the procedure of Example 1 (b) are set forth in Table C.

EXAMPLE 6

(a) Using procedures, reagents and apparatus as described in Example 1, a reaction mixture was prepared which contained 0.02 moles (TPA)$_2$O, 0.791 moles SiO$_2$, 0.063 moles K$_2$O, 0.166 moles ammonium fluoride and 11.2 moles water. After heating the reaction mixture, which had an initial pH of 9.95, for 71 hours at 200° C., the crystalline precursor product had the chemical composition, before calcination, of 88.6 wt.% SiO$_2$, 11.45 wt.% (TPA)$_2$O, 0.04 wt.% K$_2$O and 0.93 wt.% F. The precursor crystal product contained no quartz impurity and consisted of large rod-shaped crystals measuring 118 × 19 microns. The X-ray powder diffraction pattern of a calcinated sample was in accordance with Table A. Adsorption properties of the calcined product treated and tested in accordance with the procedure of Example 1 (b) are set forth in Table C.

(b) To demonstrate the effect of pH and presence of fluoride anion in the preparation of crystals of the novel silica polymorph of this invention, part (a) of this Example 6 was repeated except that no fluoride was included and the pH of the reaction mixture was 13.4. The precursor product consisted of small growth-agglomerate platy-type crystals of about 2 to 23 microns in diameter and also included quartz and cristobalite impurities. The X-ray pattern of the calcined product (600° C. for 1 hour) exhibited a reflection at a d-spacing of 3.74 A and showed no reflection at a d-spacing of 3.62 A. Adsorption properties of the calcined product treated and tested in accordance with the procedure of Example 1 (b) are set forth in Table C.

TABLE C

| Sample | Adsorbate | Temperature °C | Pressure mm.Hg | Wt.% Adsorbed |
|---|---|---|---|---|
| Ex. 1 (a) | Oxygen | −183 | 114 | 15.49 |
| " | Oxygen | −183 | 748 | 15.59 |
| " | Water | 23.5 | 4.6 | 0.14 |
| " | Water | 23.5 | 21.4 | 1.56 |
| " | n-Hexane | 23.4 | 45.5 | 10.45 |
| " | Cyclohexane | 23.4 | 60.5 | 2.32 |
| Ex. 1 (b) | Oxygen | −183 | 100 | 16.04 |
| " | Oxygen | −183 | 758 | 16.16 |
| " | Water | 23 | 4.6 | 0.12 |
| " | Water | 23 | 19.4 | 1.20 |
| " | n-Hexane | 23 | 39 | 10.71 |
| " | Cyclohexane | 23 | 58 | 1.44* |
| Ex. 4 (a) | Oxygen | −183 | 100 | 16.3 |
| " | Oxygen | −183 | 758 | 16.61 |
| " | Water | 23 | 4.6 | 0.21 |
| " | Water | 23 | 19.4 | 1.10 |
| " | n-Hexane | 23 | 39 | 10.88 |
| " | Cyclohexane | 23 | 58 | 1.05* |
| Ex. 4 (b) | Oxygen | −183 | 100 | 14.00 |
| " | Oxygen | −183 | 740 | 14.05 |
| " | Water | 23 | 4.6 | 0.19 |
| " | Water | 23 | 17.6 | 0.60 |
| " | n-Hexane | 23 | 45.5 | 9.36 |
| " | Cyclohexane | 23 | 58 | 1.07* |
| Ex. 5 | Oxygen | −183 | 100 | 14.87 |
| " | Oxygen | −183 | 758 | 14.58 |
| " | Water | 23 | 4.6 | 0.17 |
| " | Water | 23 | 19.4 | 0.83 |
| " | n-Hexane | 23 | 39 | 9.90 |
| " | Cyclohexane | 23 | 58 | 0.67 |
| Ex. 6 (a) | Oxygen | −183 | 100 | 15.78 |
| " | Oxygen | −183 | 758 | 15.78 |
| " | Water | 23 | 4.6 | 0.10 |
| " | Water | 23 | 19.4 | 1.27 |
| " | n-Hexane | 23 | 39 | 10.75 |
| " | Cyclohexane | 23 | 58 | 1.08* |
| Ex. 6 (b) | Oxygen | −183 | 100 | 14.23 |
| " | Oxygen | −183 | 758 | 15.41 |
| " | Water | 23 | 4.6 | 2.72 |
| " | Water | 23 | 19.4 | 6.98 |
| " | n-Hexane | 23 | 39 | 9.21 |
| " | Cyclohexane | 23 | 58 | 3.57 |

*Not equilibrium values

It is readily apparent from the data of Table C that; (a) grinding the large crystals neither decreased their hydrophobicity nor diminished their oxygen adsorption capacity; (b) the silica crystals produced by the fluoride anion inclusion process of the present invention have superior hydrophobicity compared with the prior known crystalline silicas; and (c) the crystals of the present invention have slightly smaller effective pore diameters, based on cyclohexane adsorption rates.

As a further illustration of the hydrophobic/organophilic character of the crystalline product of this invention, a sample of the crystals was contacted with water vapor at room temperature and equilibrium pressure until they were saturated with adsorbed water. Thereafter the crystals were placed in an atmosphere of n-hexane with 45 mm. Hg pressure and the percentage weight increase due to n-hexane adsorption at equilibrium observed. These so-called "Δ-loadings" of n-hexane for the samples of Table C, supra, are set forth in Table D.

TABLE D

| Sample | "Δ-loading" with n-Hexane, wt. pct. |
|---|---|
| Ex. 1 (b) | + 10.34 |
| Ex. 4 (a) | + 10.61 |
| Ex. 4 (b) | + 9.18 |
| Ex. 5 | + 9.57 |
| Ex. 6 (a) | + 10.20 |
| Ex. 6 (b) | + 7.75 |

The data of the foregoing Table D clearly demonstrate the strong affinity of the material of this invention for hydrocarbons in the presence of water.

Thus, in accordance with the foregoing, the novel crystalline silica compositions of the present invention are synthetic silica polymorphs consisting of, or at least consisting essentially of, silica, said polymorph after calcination at 600° C. in air for at least 1 hour having a means refractive index of 1.39 ± 0.01, a specific gravity at 25° C. of 1.70 ± 0.05 g./cc., an adsorption capacity for water vapor at 23° C. and a water vapor pressure of 4.6 mm. Hg, of less than 1 weight per cent and having an infrared absorption spectrum which exhibits a substantial absence of absorption in the region 3700 to 3100 cm$^{-1}$. The polymorph can alternatively be defined as having, after calcination at 600° C. in air for at least 1 hour, an X-ray powder diffraction pattern which exhibits at least those d-values set forth in Table A supra, a mean refractive index of 1.39 ± 0.01, a specific gravity at 25° C. of 1.70 ± 0.05 g./cc., an adsorption capacity for water vapor at 23° C. and a water vapor pressure of 4.6 mm. Hg, of less than 1 weight per cent and having an infrared absorption spectrum which exhibits a substantial absence of absorption in the region 3700 to 3100 cm$^{-1}$.

The crystalline silica compositions of the present invention are suitable for use in all of the absorption and catalyst applications in which the above-referenced silicalite can be employed. In addition, because of the extreme hydrophobicity of these new compositions, they are more advantageously employed in adsorption separations requiring minimum water adsorption or least interference from water vapor in the adsorption of less polar materials. They are also advantageously used for separations of adsorptions in which the presence of surface hydroxyl groups or adsorbed water would react with or catalyze reactions of the feed and/or product streams.

The foregoing X-ray powder diffraction data were obtained by standard techniques. Thus the radiation was the K-alpha doublet of copper, and a Geiger-counter spectrometer with a strip-chart pen recorder was used. The peak or line heights and the positions thereof as a function of 2 times theta, where theta is the Bragg angle, was read from the spectrometer chart. From these the relative intensities of the reflected lines or peaks, and d, the interplanar spacing in Angstrom units corresponding to the recorded lines were determined.

What is claimed is:

1. A synthetic crystalline silica polymorph, said silica polymorph after calcination in air for at least 1 hour at 600° C., having a mean refractive index of 1.39 ± 0.01, a specific gravity at 25° C. of 1.70 ± 0.05 g./cc., an adsorptive capacity for water vapor at 23° C and a water vapor pressure of 4.6 mm Hg of less than 1 weight percent, having an infrared absorption spectrum which exhibits a substantial absence of absorption in the region 3700 to 3100 cm$^{-1}$ and having an X-ray powder diffraction pattern containing at least those d-spacings set forth in Table A, said X-ray diffraction pattern being further characterized by the absence of a reflection intermediate the reflections which correspond to the d-spacings, 3.82 ± 0.04° A and 3.71 ± 0.02A.

2. Process for preparing the crystalline silica polymorph of claim 1 which comprises providing a reaction mixture having a pH between 7 and 11, and which in terms of moles of oxides contains from 150 to 1500 moles $H_2O$, from 13 to 50 moles of reactive $SiO_2$, from 0 to 20 moles $M_2O$ where M represents an alkali metal, each of the aforesaid reactants being present per mole of $Q_2O$ where Q represents a quaternary cation having the formula $(R_4X)^+$, in which each R represents hydrogen or alkyl group containing from 2 to 6 carbon atoms, and X represents phosphorus or nitrogen, said reaction mixture also containing from 2 to 12 moles of fluoride ion per mole of $Q_2O$ heating the reaction mixture thus provided at a temperature of from 100° to 250° C. until a crystalline precursor is formed, isolating said crystalline precursor and calcining same at a temperature of from 400° to 1000° C. until the said crystalline silica polymorph is formed.

3. Process according to claim 2 wherein the reaction mixture is substantially free to alkali metal.

4. Process according to claim 2 wherein the reaction mixture contains from 0 to 6 moles $M_2O$ per mole of $Q_2O$ and the reaction mixture is heated at a temperature of from 100° to 200° C. to form the crystalline precursor.

5. Process according to claim 4 wherein the alkali metal is at least one selected from the group consisting of sodium and potassium.

6. Process according to claim 2 wherein the pH of the reaction mixture is within the range of 7.4 to 10.

* * * * *